(12) United States Patent
Vija

(10) Patent No.: US 8,294,109 B2
(45) Date of Patent: Oct. 23, 2012

(54) EXTRACTING LOCATION INFORMATION USING DIFFERENCE IMAGES FROM A NON-PARALLEL HOLE COLLIMATOR

(75) Inventor: Alexander Hans Vija, Evanston, IL (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 613 days.

(21) Appl. No.: 12/560,042

(22) Filed: Sep. 15, 2009

(65) Prior Publication Data
US 2010/0067766 A1 Mar. 18, 2010

Related U.S. Application Data

(60) Provisional application No. 61/097,925, filed on Sep. 18, 2008.

(51) Int. Cl.
*G01T 1/166* (2006.01)
*G21K 1/02* (2006.01)

(52) U.S. Cl. .............. 250/363.04; 250/363.1; 382/131

(58) Field of Classification Search ............ 250/363.02–363.04, 363.06, 363.1; 382/131
See application file for complete search history.

(56) References Cited

U.S. PATENT DOCUMENTS

| | | | | |
|---|---|---|---|---|
| 3,979,594 A | * | 9/1976 | Anger | 250/369 |
| 4,352,018 A | * | 9/1982 | Tanaka et al. | 250/363.03 |
| 4,859,852 A | * | 8/1989 | Genna et al. | 250/363.1 |
| 5,429,135 A | * | 7/1995 | Hawman et al. | 600/436 |
| 5,760,401 A | * | 6/1998 | Nelleman et al. | 250/363.03 |
| 6,100,531 A | * | 8/2000 | Hines et al. | 250/363.04 |
| 6,177,675 B1 | * | 1/2001 | Gagnon et al. | 250/363.1 |

* cited by examiner

*Primary Examiner* — Alexander H Taningco
(74) *Attorney, Agent, or Firm* — Peter Kendall

(57) ABSTRACT

A method for tomographic nuclear imaging determines the distance between a non-parallel hole collimator surface and a region of interest (ROI) by obtaining difference images between images acquired at different view angles of the ROI. The distance may be used in a nuclear image reconstruction algorithm to more accurately reconstruct an image of the ROI. The method takes advantage of the non-stationary Point Spread Function of a non-parallel hole collimator to determine depth information of gamma events emitted from the ROI.

17 Claims, 6 Drawing Sheets

EXTRACTING LOCATION INFORMATION USING DIFFERENCE IMAGES FROM A NON-PARALLEL HOLE COLLIMATOR

BACKGROUND OF THE INVENTION

1. Field of Invention

The invention relates generally to imaging systems and more particularly to imaging systems for use in nuclear medicine.

2. Description of Related Art

In a nuclear medicine imaging device, such as a gamma camera for obtaining either planar images or Single Photon Emission Computed Tomography (SPECT) images, a collimator is mounted to the face of the imaging device. The collimator is constructed of a dense, high-atomic-number material, such as lead. The material is bored with numerous tiny straight holes that allow radiation (e.g., gamma rays) to pass through. If the radiation is not traveling along the path of the hole, then the material absorbs it and it will not reach the detector. The collimator thus collimates radiation, which is emitted from a distributed source (e.g., a radiopharmaceutical or radioisotope chosen for its affinity for a particular organ, tissue or region of the body) within a patient, before the radiation strikes a detector crystal.

FIG. 2 is a block diagram of an exemplary SPECT or planar imaging device. A radiation source 302 within an object to be imaged 304 (e.g., human body part) emits gamma photons that emanate from the object 304, pass through the collimator 308, and are captured by a detector 306, usually a large flat crystal of sodium iodide with thallium doping in a light-sealed housing, that converts the detected radiation into spatial projection data. The system accumulates counts of gamma photons that are absorbed by the crystal in the detector 306. The crystal scintillates in response to incident gamma radiation. When an absorbed gamma photon releases energy, it produces a faint flash of light. This phenomenon is similar to the photoelectric effect. Photomultiplier tubes (PMT) behind the crystal detect the fluorescent flashes and convert them into electrical signals, and a computer 310 sums the fluorescent counts. The computer 310 in turn constructs and displays a two dimensional image of the relative spatial count density or distribution on a monitor. This image then reflects the distribution and relative concentration of radioactive tracer elements present in the organs and tissues imaged. The two dimensional images are also referred to as planar images because they are taken from only one angle and are similar to an x-ray radiograph.

In order to obtain spatial information about the gamma emissions from an imaging object, a method of correlating the detected photons with their point of origin is required. Single Photon Emission Computed Tomography (SPECT) captures multiple images from multiple angles in order to reconstruct a three-dimensional representation of the region of interest (ROI). SPECT is usually performed using a parallel-hole collimator. The parallel-hole collimator does not provide any depth information as to the spatial origin of a gamma incident on its face. Thus, reconstructing the image in three dimensions requires processing multiple planar images of the ROI from multiple view angles in a manner well known in the art to yield a human-readable, three-dimensional image of the object. Because of the need to acquire planar images from multiple view angles sufficient to reconstruct tomographic images, the required scan time is relatively long.

A varying focal-length or multi-focal collimator (MFC) has multiple focal points for axial and transaxial detector directions. The advantage of a MFC is that it enables the imaging of small organs or regions within a field of view (FOV) of a gamma camera detector to be imaged faster than with use of a parallel-hole collimator, as the acquired projection data can be limited to the ROI within the larger FOV. Tomographic reconstruction methods for MFC acquired projection data are known. However, such methods use such projection data in the same way that projection data are used in parallel-hole collimator imaging.

In particular, MFC reconstruction methods fail to take into account that the Point Spread Function (PSF) of a detector with a MFC is non-stationary with respect to the position of the source relative to the MFC collimator surface, in contrast with parallel-hole collimators, where the PSF is static with respect to the source position relative to the collimator surface (i.e., in the axial-transaxial direction). The PSF describes the response of the detector to a point source of radiation. In a parallel hole collimator, the PSF of the detector is static with respect to the location of a point source vis-a-vis the collimator. In contrast, the PSF of a non-parallel hole collimator is non-stationary, meaning that the PSF of an MFC detector varies as the test point source is shifted in position with respect to the collimator, in all directions.

Thus, the possibility exists for improvement in image quality by taking into account the depth information available from consideration of the fact that PSF in a MFC is non-stationary.

SUMMARY OF THE INVENTION

An object of the invention is to take advantage of the non-stationary nature of PSF in multi-focal collimator nuclear detectors. By using non-parallel hole collimators, e.g., multi-focal, varying-focal length, fan beam or astigmatic collimators, the Point Spread Function (PSF) is no longer stationary, as it is in a parallel hole collimator, and depth information is thus encoded in difference images of the ROI in multiple locations. One aspect of the invention is to decode the depth information from the difference images.

According to one embodiment, a subject is injected with, for example, a radioisotope and is imaged with a gamma camera. Using a non-parallel hole collimator, two or more images may be made of the subject at different locations by changing the position of the subject relative to the collimator surface. This may be done by either moving the subject or by moving the collimator. The two or more images may be combined to show the differences between them. This combination is referred to as a difference image. By examining the difference images, the depth of the gamma events may be determined, for example, by using a chi squared fit algorithm.

As is known in the art, the depth information may then be used in a reconstruction algorithm to produce a more accurate tomographic image based on the projection data received during the nuclear imaging process. An accurate determination of the depth information will yield a more precise reconstruction of the image.

DETAILED DESCRIPTION OF EXEMPLARY EMBODIMENTS

Figure 1:
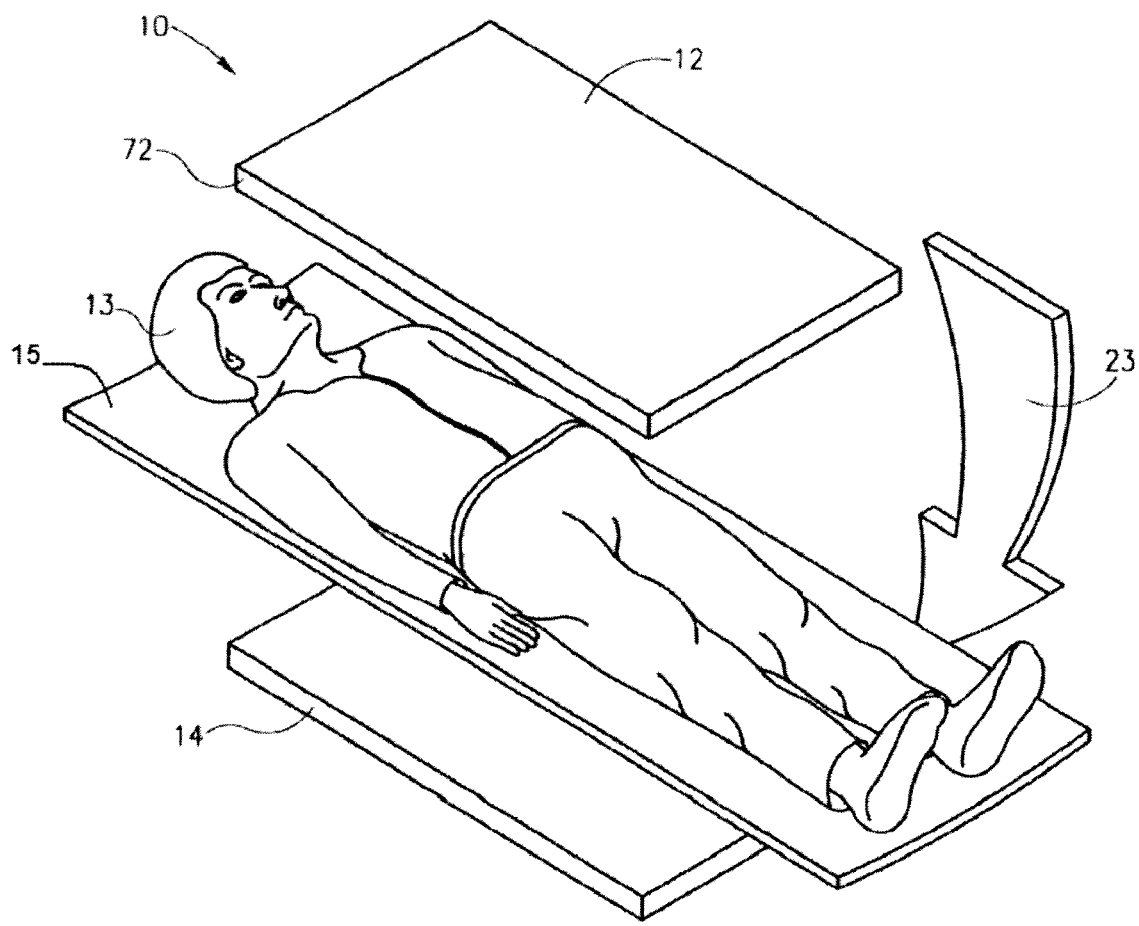
FIG. 1 is an illustrative representation of a patient inside a nuclear imaging apparatus.
Figure 2:
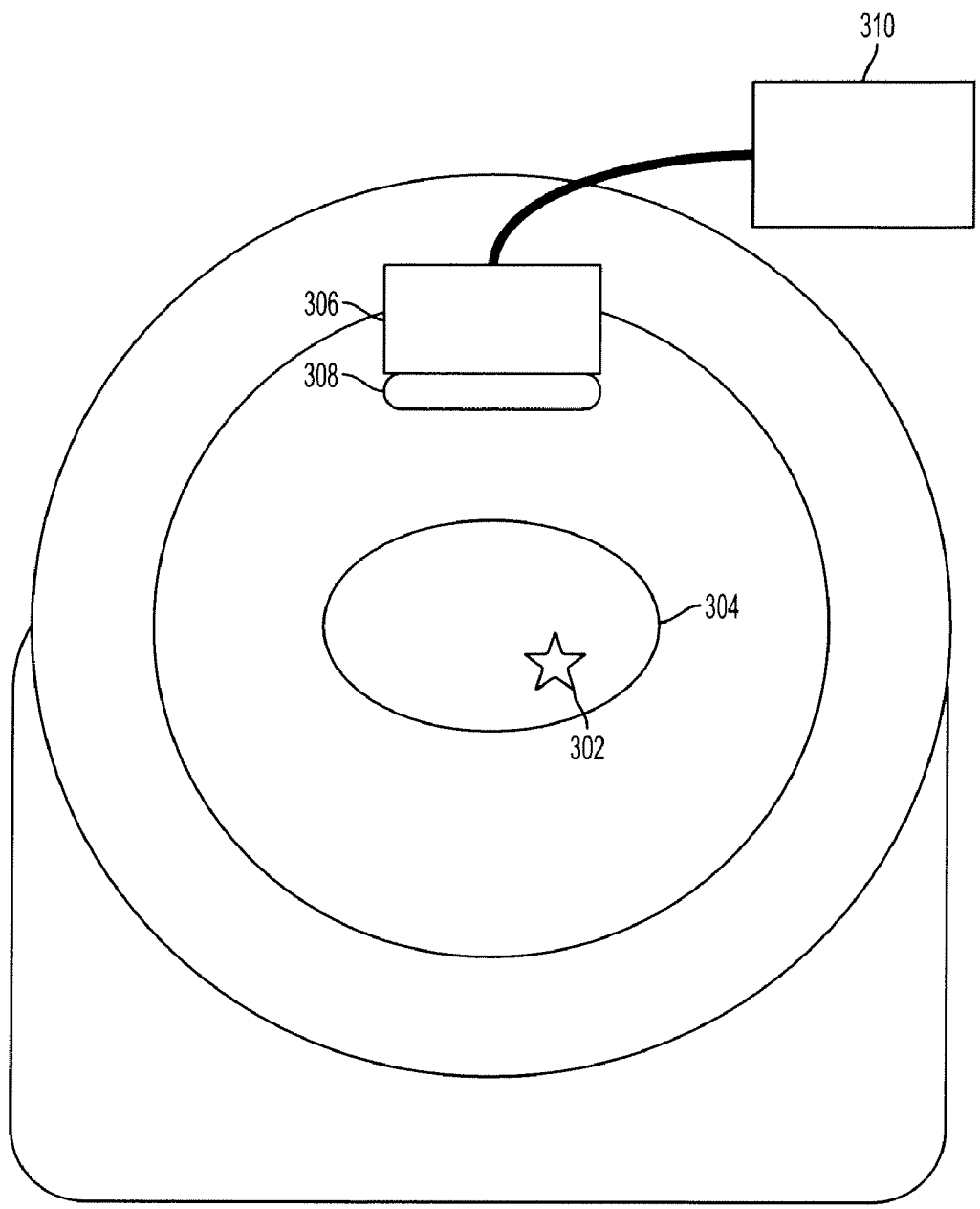
FIG. 2 is an illustrative block diagram of a nuclear system.

The following description is presented to enable any person skilled in the art to use a method to efficiently produce superior reconstructed images using, for example, planar imaging or Single Photon Emission Computed Tomography (SPECT). Various modifications to the preferred embodiments will be readily apparent to those skilled in the art, and the generic principles defined herein may be applied to other embodiments and applications without departing from the spirit and scope of the invention. In the following description, numerous details are set forth for the purpose of explanation. However, one of ordinary skill in the art will realize that the invention might be practiced without the use of these specific details. In order to more efficiently illustrate and describe embodiments of the invention, identical reference numerals are used in the specification and drawings to identify parts that are essentially the same in different stages, versions or instantiations of such parts shown in the drawings. Thus, the present invention is not intended to be limited to the embodiments shown, but is to be accorded the widest scope consistent with the principles and features disclosed herein.

FIG. 1 depicts an exemplary embodiment of a patient 13 on a patient bed 15 inside a nuclear imaging apparatus 10. Two collimators, 12 and 14, are located around the patient 13. The collimators 12 and 14 collimate radiation from the patient to be imaged. The collimated radiation is detected using a crystal (not shown) which scintillates in response to incident gamma radiation. The collimators 12 and 14 may rotate around the patient as shown by arrow 23. The collimators 12 and 14 may also shift or swivel. In addition, the patient bed 15 may be capable of moving by rotating, shifting, or swiveling. The motion of the patient bed 15 and/or the collimators 12 and 14 facilitates taking images of the patient 13 from different angles and orientations. In accordance with the present invention, a non-parallel hole (e.g., multifocal) collimator is used to acquire image data of a patient at multiple orientations.

Figure 3:
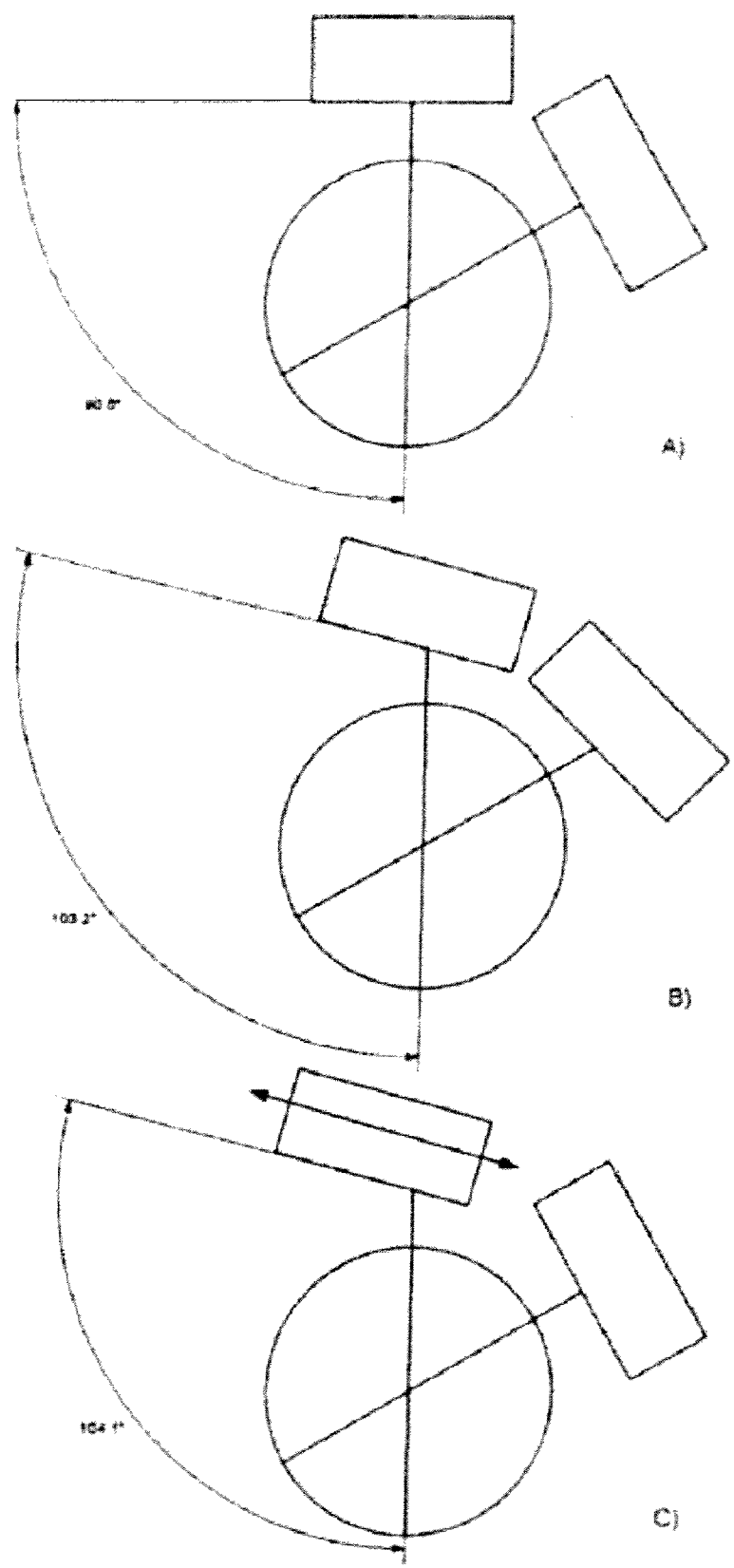
FIG. 3 is an illustrative representation of the possible types of detector motion around a gantry center.

FIG. 3 depicts examples of possible detector movements. Each of the three diagrams illustrates the motion of one detector with respect to the center of the gantry. The top example, labeled A, depicts the collimator/detector rotating around a gantry center. The center example, labeled B, depicts the collimator/detector swiveling around its central axis in addition to rotation about the gantry center. Finally, the bottom example, labeled C, depicts the collimator/detector shifting or translating the detector center with respect to the gantry center, in addition to rotation about the gantry center and swiveling about the detector central axis. The motions may occur independently or concurrently.

A first image of a subject within the gantry may be taken with the multi-focal collimator in a first position with respect to the subject, and a second image may be taken with the collimator in a second position. The images may be combined to form difference images. For example, the imaging subject may lie at a distance $z_0$ from the surface of the collimator and a point $(x_0, y_0, z_0)$. Next, the subject can be moved along one axis while keeping the subject at the same position along the other two axes by moving the subject to a point $(x_0, y_1, z_0)$. The combination of the images taken at the two points reveals a difference image. Due to the unique characteristics of the PSF at the distance $z_0$ from the surface of the collimator, the difference image may then be examined to determine the distance of the subject from the collimator surface using, for example, a chi-squared fit algorithm.

An embodiment of the present invention is based on the fact that in a multi-focal collimator, the PSF is dependent on the location of a gamma event with respect to the collimator surface (in the axial and trans-axial directions). Thus, depth information is available and is encoded in a difference image at different angular views of a target object. In accordance with an embodiment of the invention, difference images obtained as the object moves through the MFC FOV at $z_0$ are uniquely different from difference images obtained as the object moves through the MFC FOV at $z_1 \neq z_0$. Thus, tomographic information can be extracted from the projection data as the projection views are being accumulated, and a tomographic image can be formed before the full detector orbit scan around the patient has been completed.

A chi-squared fit algorithm may be used to compare an expected difference image at a certain distance with the actual obtained image. However, it should be appreciated by those skilled in the art that other types of algorithms can be used without departing from the scope of the invention. The expected image may be calculated because the PSF at each distance from the collimator surface is known and is unique with respect to different distances from the surface of the collimator due to the non-parallel orientation of the collimator holes. Because the PSF is unique at different distances from the surface of the collimator, the expected difference between images of the subject at the two points $(x_0, y_0, z_n)$ and $(x_0, y_1, z_n)$ can be determined for different distances from the surface of the collimator (i.e., at different $z_n$). Using this information, the difference between two images of the subject at different positions may be predicted at different distances from the collimator surface. Thus, the depth of an ROI may be estimated within 1 cm and thus eliminate trial-and-error, and also enable applications that require planar images with a MFC.

The chi squared fit algorithm enables an iterative process of estimating the distance of the subject from the collimator surface until one iteration of the algorithm results in a best fit. In other words, a best fit can mean the expected difference between the images is approximately equal to the actual recorded difference. When a best fit is found, in the case of SPECT imaging, the distance of the ROI to the collimator surface may be used as an input into a reconstruction algorithm to produce a more precisely reconstructed image of the subject. This process may occur iteratively in the case of SPECT imaging because many pictures are taken to render a three dimensional reconstruction. Therefore, the distance calculation may be made several times in order to determine a more precise distance.

Figure 4:
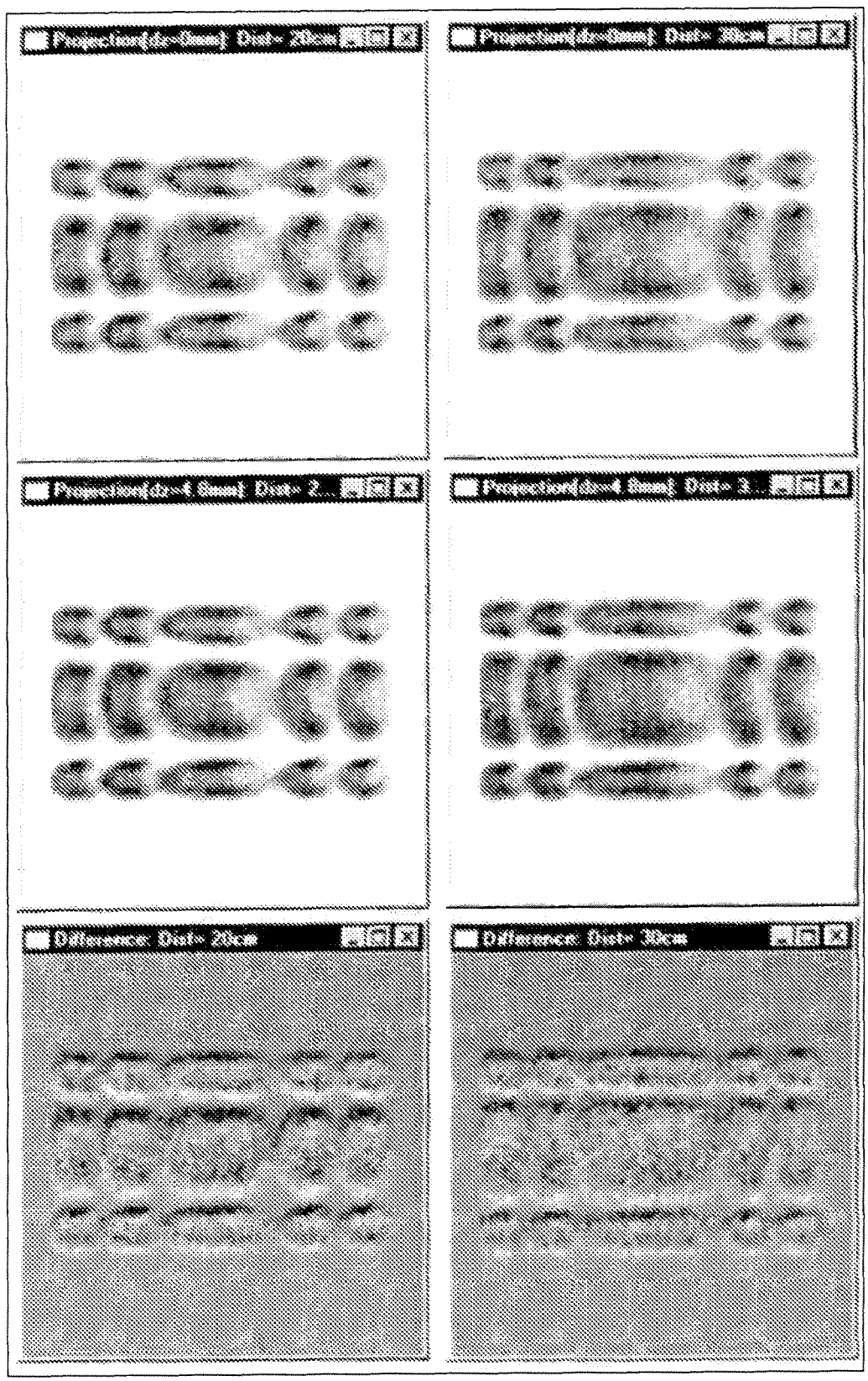
FIG. 4 is an illustration of images taken of an object at different locations relative to a collimator surface, images taken after shifting the object in a plane parallel to the collimator surface, and resulting difference images, in accordance with an embodiment of the present invention.

FIG. 4 is an example of images of a subject at the same distance from the surface of a collimator, but at two different locations, and difference images. The subject is a cylindrical object, with open side pointing right, at two different distances from a collimator surface. Each of the six images contains a composite of fifteen images of the object at different locations. The left column depicts the object at 20 cm from the collimator surface and the right column depicts the object at 30 cm from the collimator surface. As can clearly be seen, the difference between the images in the same location but shifted up or down (e.g., left column versus right column) significantly changes the appearance of the object and is unique to the distance from the collimator surface. The top images depict the object in fifteen different locations but in the same plane parallel to the collimator surface. The second row depicts the same object, but shifted horizontally 4.8 mm. It is only important that the object is shifted; it is not important how much it is shifted. The third row depicts difference images generated by combining images from the top two rows in the same column.

The difference images in the bottom row of FIG. 4 may be used in the iterative chi-squared fit algorithm discussed above to determine the distance of the cylindrical object from the collimator surface. The distances may then be used as an input into a reconstruction algorithm to efficiently produce a more accurately reconstructed image. Many reconstruction algorithms exist in the art and are well known, and therefore will not be further described here. Many of these reconstruction algorithms use the distance between the subject and the collimator surface as an input. Thus, the method described above to yield an accurate distance measurement may be used in these algorithms to reconstruct a more precise image.

Figure 5:
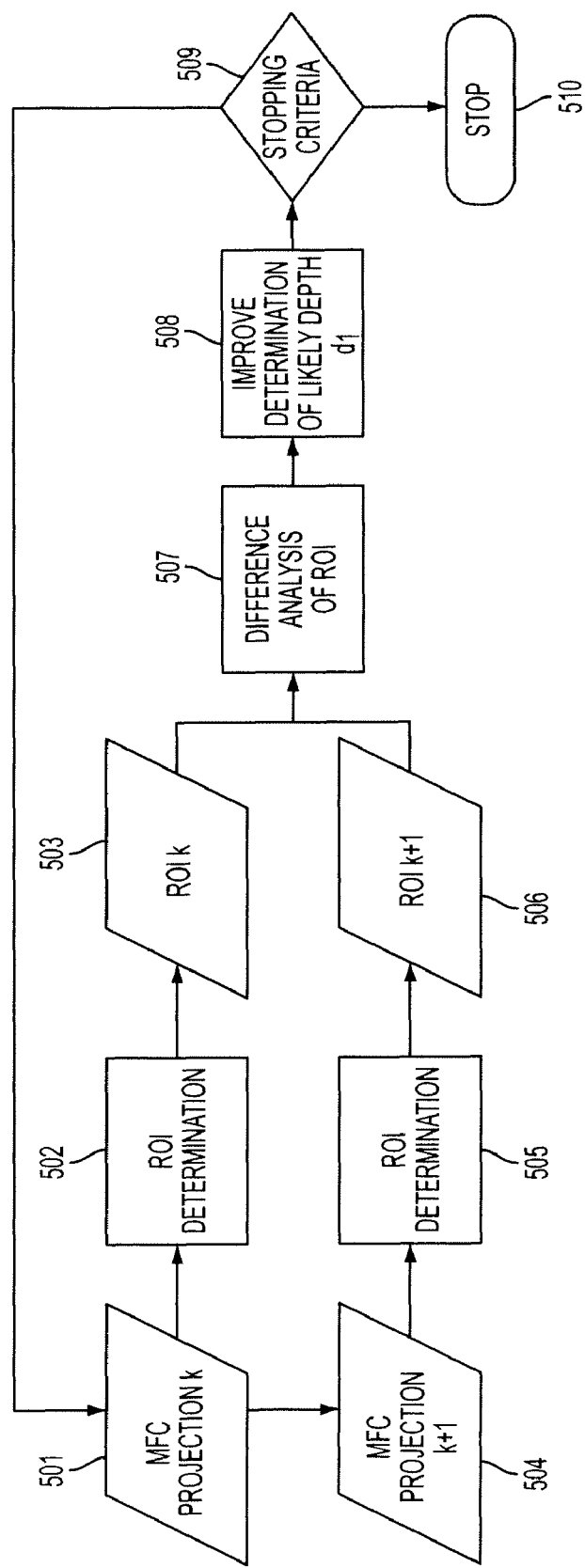
FIG. 5 is block diagram of a process for taking two images, forming a difference image, and calculating a distance to an ROI based on the difference image.

To further illustrate the process used in one embodiment, FIG. 5 describes obtaining two images of the reconstruction area using a multi-focal collimator (MFC). The ROI in the reconstruction area is determined and a difference image is obtained. The difference image is then used to determine the distance of the RIO from the surface of the collimator and used in a reconstruction algorithm. The process may occur iteratively, for example in a SPECT imaging process, until all necessary images are taken and the process can stop.

More specifically, the process 500 is initiated at step 501 where during bed-in movement, MFC stationary projection data is acquired. At steps 502 and 503, a ROI is determined in one image frame following the shape of the target organ. The process identifies the shape of the target based on the initial ROI. The process is repeated at steps at steps 504, 505 and 506. The process creates a new shape based ROI based on the projected target organ in that frame, which is slightly distorted. This can be performed via a segmentation method. At step 507, the difference between ROIs is compared. At step 508, an improved determination of likely depth d is provided. The gradual shape deformation of subsequent translated projection images is used to compute the most likely depth given the known MFC characteristics, consistent with all shapes. This can be performed by some iterative scheme where some appropriate objective function, for instance the L2 measure of the difference images is minimized. The process proceeds to step 509 where a determination is made whether to repeat the process. If not repeated, the process is terminated at step 510.

Figure 6:
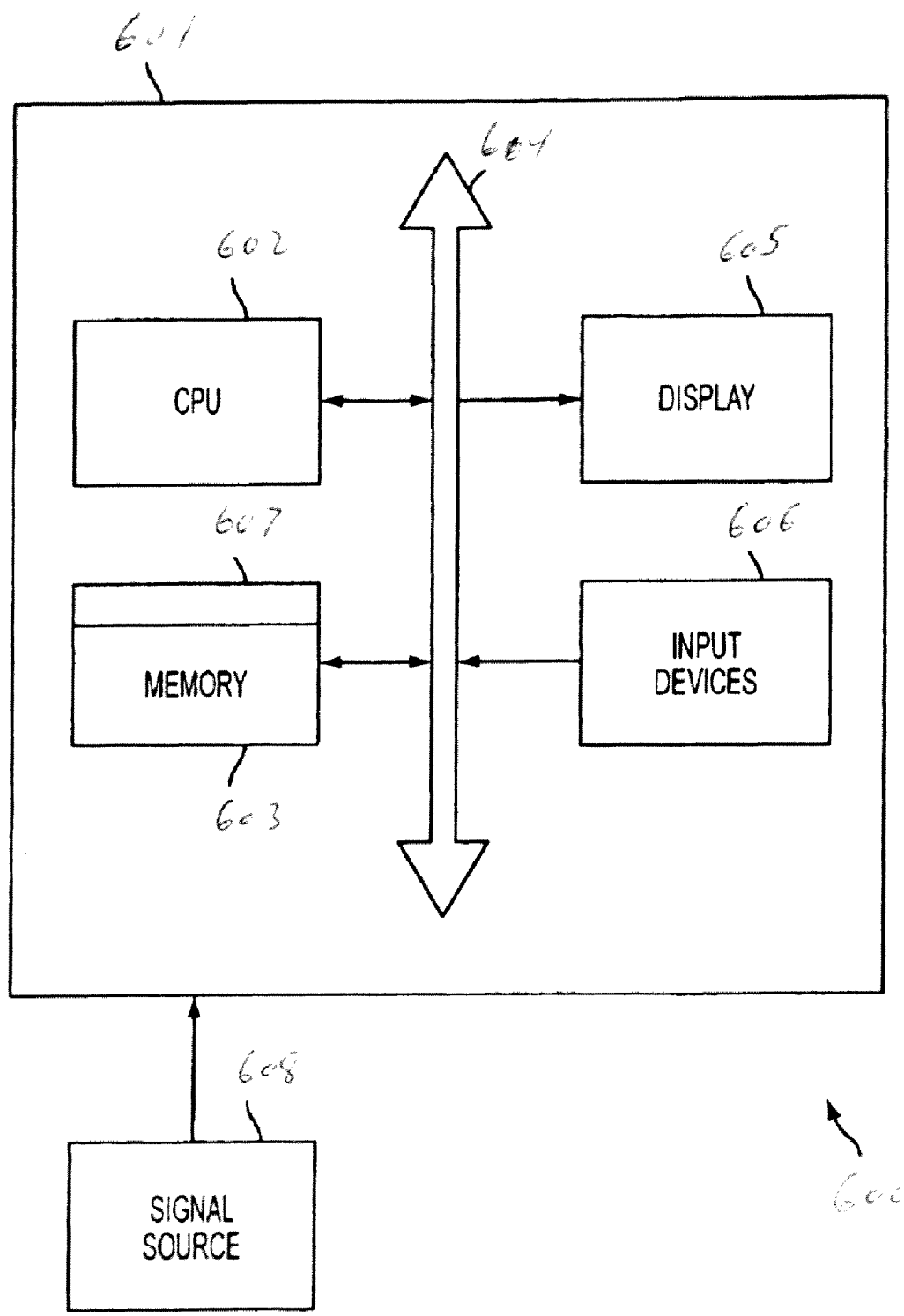
FIG. 6 is a block diagram of a computer for processing images taken of an object at different locations relative to a collimator surface, images taken after shifting the object in a plane parallel to the collimator surface, and resulting difference images, in accordance with an embodiment of the present invention.

Referring now to FIG. 6, according to an embodiment of the present invention, a computer system 601 for implementing the present invention can comprise, inter alia, a central processing unit (CPU) 602, a memory 603 and an input/output (I/O) interface 604. The computer system 301 is generally coupled through the I/O interface 604 to a display 605 and various input devices 606 such as a mouse and a keyboard. The support circuits can include circuits such as cache, power supplies, clock circuits, and a communication bus. The memory 603 can include random access memory (RAM), read only memory (ROM), disk drive, tape drive, etc., or a combinations thereof. The present invention can be implemented as a routine 607 that is stored in memory 603 and executed by the CPU 602 to process the signal from the signal source 608. As such, the computer system 601 is a general purpose computer system that becomes a specific purpose computer system when executing the routine 607 of the present invention.

The computer system 601 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below.

Those of ordinary skill may vary the data collection apparatus and methods for recording and processing the images without varying from the scope of the invention as defined in the appended claims.

What is claimed is:

1. A method of reconstructing a tomographic image of a subject imaged with a nuclear imaging detector having a non-parallel hole collimator comprising:
    acquiring first projection data of a radiation field within the subject at a first view angle of said detector;
    acquiring second projection data of said radiation field within the subject at a second view angle of said detector different than said first view angle;
    combining the first and second projection data to form a difference image; and
    determining a location of the radiation field relative to the collimator surface using the difference image based on Point Spread Function (PSF) which is non-stationary and dependent on a location of a gamma event with respect to the collimator surface of the non-parallel hole collimator.

2. The method as recited in claim 1, wherein the non-parallel hole collimator is one of a group consisting of: a multi-focal collimator, a varying-focal length collimator, a fan beam collimator, and an astigmatic collimator.

3. The method as recited in claim 1, wherein the location determined using the difference image is used in a SPECT image reconstruction algorithm.

4. The method as recited in claim 1, wherein the location determined using the difference image is used in a nuclear planar image reconstruction algorithm.

5. The method as recited in claim 1, wherein said detector is swiveled about its central axis at said second view angle prior to acquiring said second projection data.

6. The method as recited in claim 1, wherein said detector at said second view is translated with respect to a center of a gantry on which said detector is mounted prior to acquiring said second projection data.

7. The method as recited in claim 1, wherein said detector at said second view angle is swiveled about its central axis and is translated with respect to a center of a gantry on which said detector is mounted prior to acquiring said second projection data.

8. A system for reconstructing images including:
a nuclear imaging detector having a non-parallel hole collimator;
a gantry supporting said detector; and
a computer for combining two images of a radiation field obtained from said detector at different positions relative to said gantry, to form a difference image, and computing a location of said radiation field using the difference image based on Point Spread Function (PSF) which is non-stationary and dependent on a location of a gamma event with respect to a collimator surface of the non-parallel hole collimator.

9. The system as recited in claim 8, wherein the non-parallel hole collimator is one of a group consisting of a multi-focal collimator, a varying-focal length collimator, a fan beam collimator, and an astigmatic collimator.

10. The system as recited in claim 8, wherein said computed location is used in an image reconstruction algorithm.

11. A computer program embodied as computer-executable instructions stored on a computer-readable medium, the program comprising instructions for:
combining at least two nuclear images of a radiation field within an imaging subject acquired by a nuclear detector having a non-parallel hole collimator, taken from different locations relative to said non-parallel hole collimator, to form a difference image; and
calculating a location of the radiation field relative to the surface of the non-parallel hole collimator using the difference image based on Point Spread Function (PSF) which is non-stationary and dependent on a location of a gamma event with respect to the surface of the non-parallel hole collimator.

12. The computer program as recited in claim 11, wherein said location is calculated using a chi-squared algorithm.

13. The computer program as recited in claim 11, wherein the program further comprises determining the distance between the radiation field and a surface of the collimator.

14. The computer program as recited in claim 11, wherein the program further comprises instructions to reconstruct a SPECT image.

15. The computer program as recited in claim 11, wherein the program further comprises instructions to reconstruct a nuclear planar image.

16. A method of estimating depth information of a radiation event from different planar images acquired using a detector having a non-parallel hole collimator, comprising
obtaining a difference image between said different planar images; and
estimating depth information based on Point Spread Function (PSF) which is non-stationary and dependent on a location of a gamma event with respect to a collimator surface of the non-parallel hole collimator.

17. The method as recited in claim 16, wherein the non-parallel hole collimator is one of a group consisting of: a multi-focal collimator, a varying-focal length collimator, a fan beam collimator, and an astigmatic collimator.

* * * * *